United States Patent [19]

Latinen, deceased

[11] 3,797,550

[45] Mar. 19, 1974

[54] WIPED FILM DEVOLATILIZER CONSTRUCTION

[75] Inventor: George A. Latinen, deceased, late of Springfield, Mass. by May V. Latinen, administratrix

[73] Assignee: Monsanto Company, St. Louis, Mo.

[22] Filed: Aug. 16, 1971

[21] Appl. No.: 171,988

[52] U.S. Cl............ 159/2 E, 425/203, 259/8
[51] Int. Cl............................................. B01d 1/28
[58] Field of Search...... 159/2 E, 6 W, 49, DIG. 10; 259/7, 8, 191, 192, 193; 425/812, 920, 203; 18/12 SV

[56] References Cited
UNITED STATES PATENTS

| | | | |
|---|---|---|---|
| 1,810,083 | 6/1931 | Norinder | 415/73 UX |
| 1,492,846 | 5/1924 | Holweck | 415/71 X |
| 2,729,522 | 1/1956 | Bechler | 308/240 |
| 2,992,679 | 7/1961 | Twaddle | 159/2 E |
| 3,113,843 | 12/1963 | Wen Han Li | 23/285 |
| 3,233,656 | 2/1966 | Rodenacker | 169/2 E X |
| 3,278,986 | 10/1966 | Welt | 18/12 |

FOREIGN PATENTS OR APPLICATIONS 35,218   12/1929   France.................. 415/73

Primary Examiner—Jack Sofer
Attorney, Agent, or Firm—Joseph S. Nelson; Edward P. Grattan; James C. Logomasini

[57] ABSTRACT

A wiped film devolatilizer adapted for processing relatively viscous melts is provided wherein a melt is end center fed to, and bottom removed from, a vapor separation chamber. Volatiles separated are cocurrently moved with melt through the vapor separation chamber before venting. The rotating members are preferably driven on a common axis by an end located power head. Melt hang up in the separation chamber is minimized or eliminated in the melt feed region; foaming problems are minimized in the vapor vent region; and devolatilizer weight distribution may be such that structural fabrication problems are minimized.

7 Claims, 23 Drawing Figures

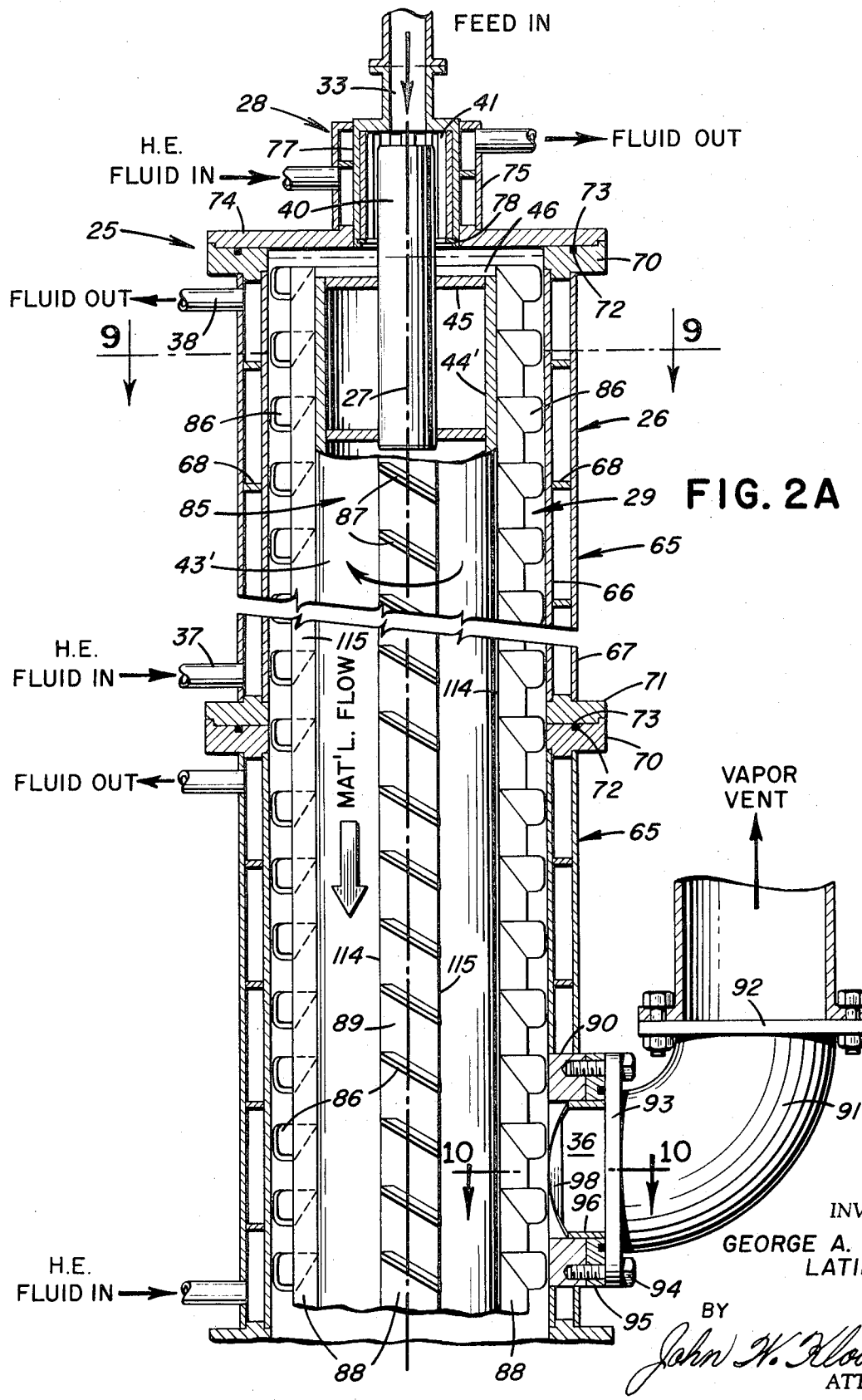

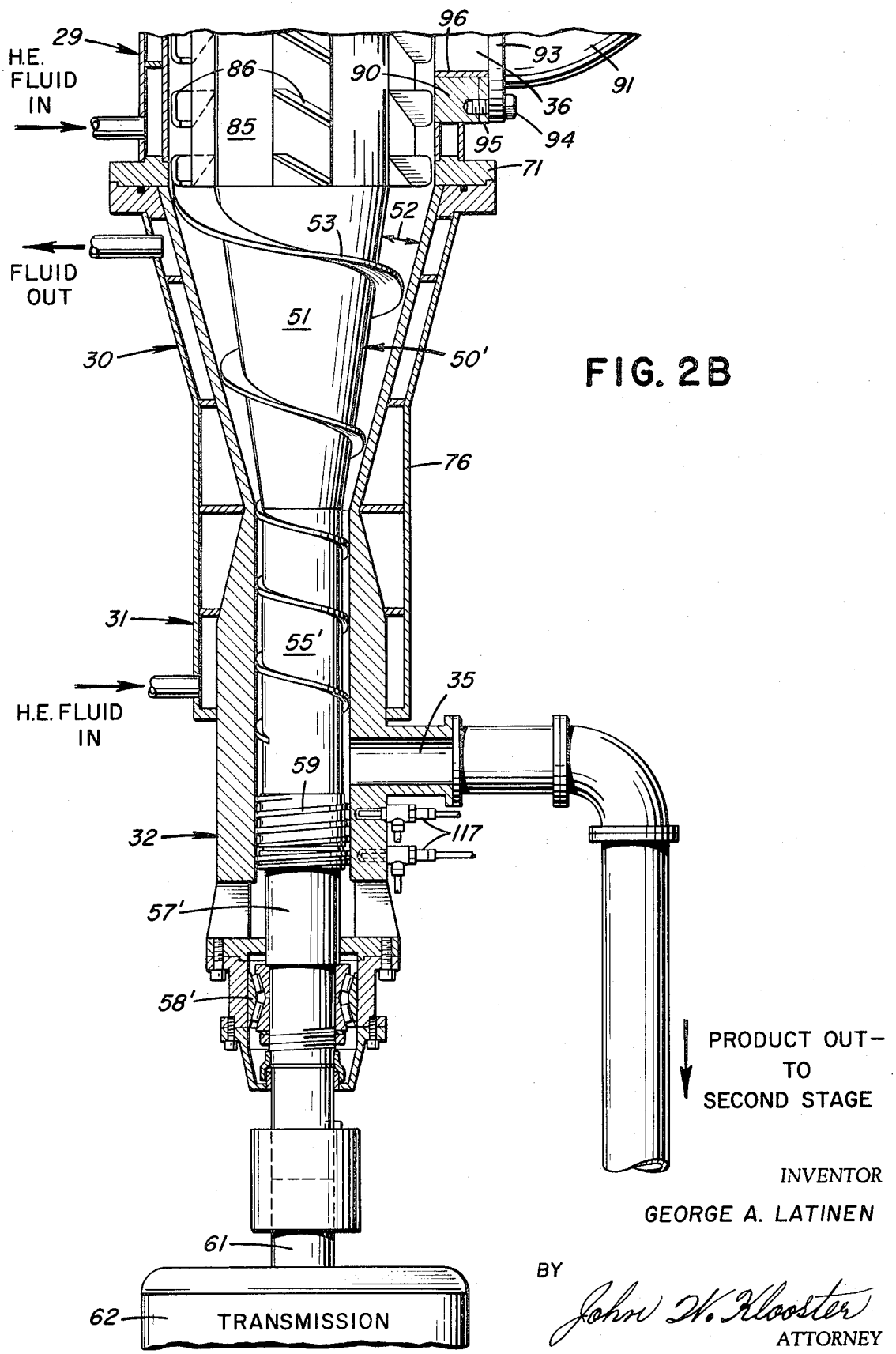

INVENTOR
GEORGE A. LATINEN

BY John W. Klooster
ATTORNEY

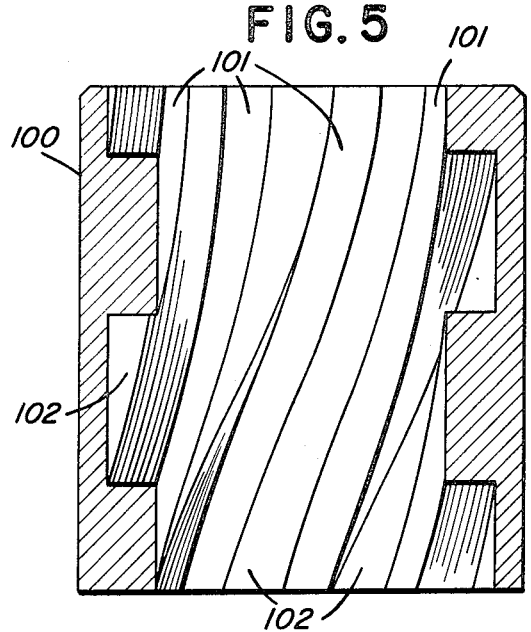
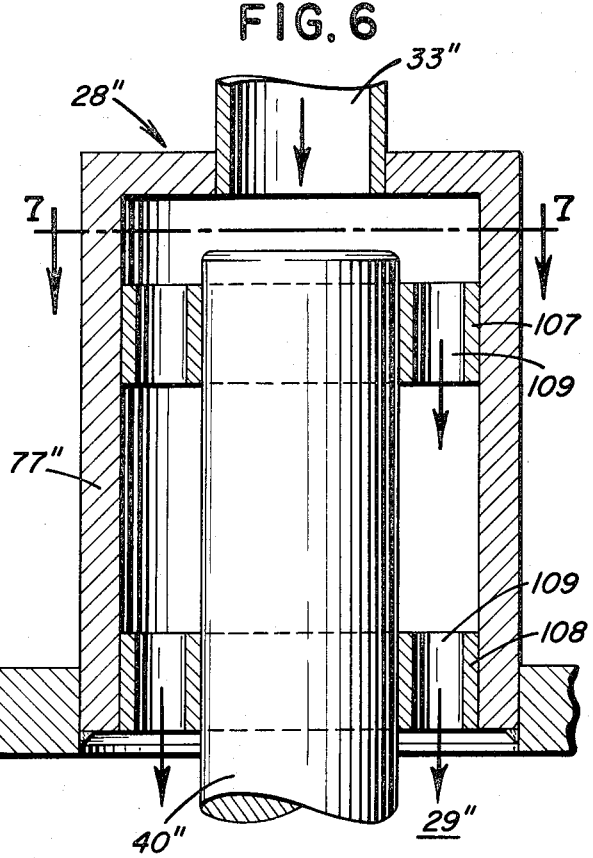
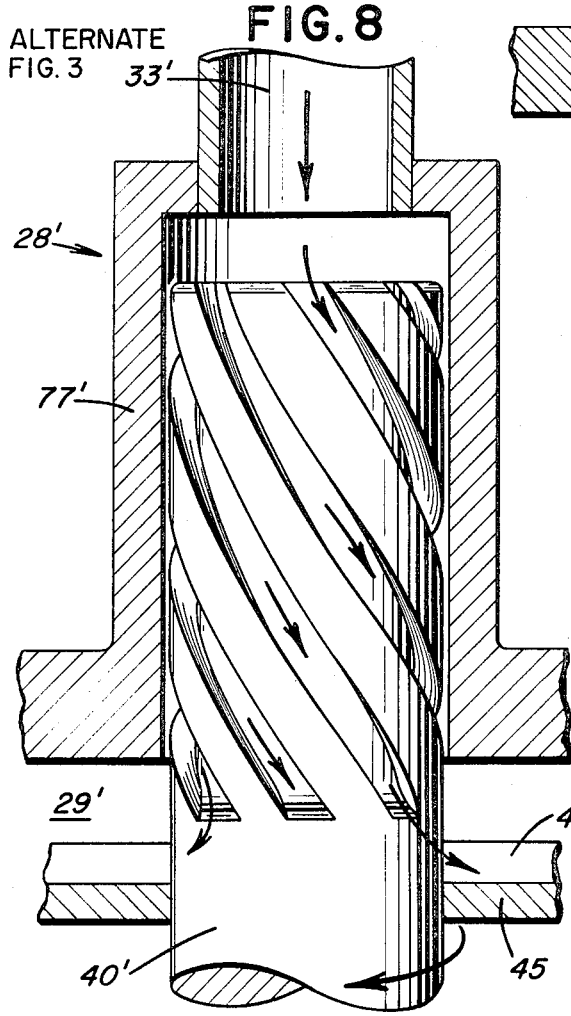
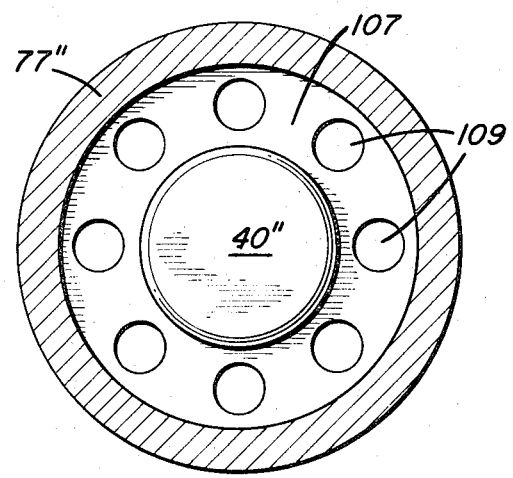

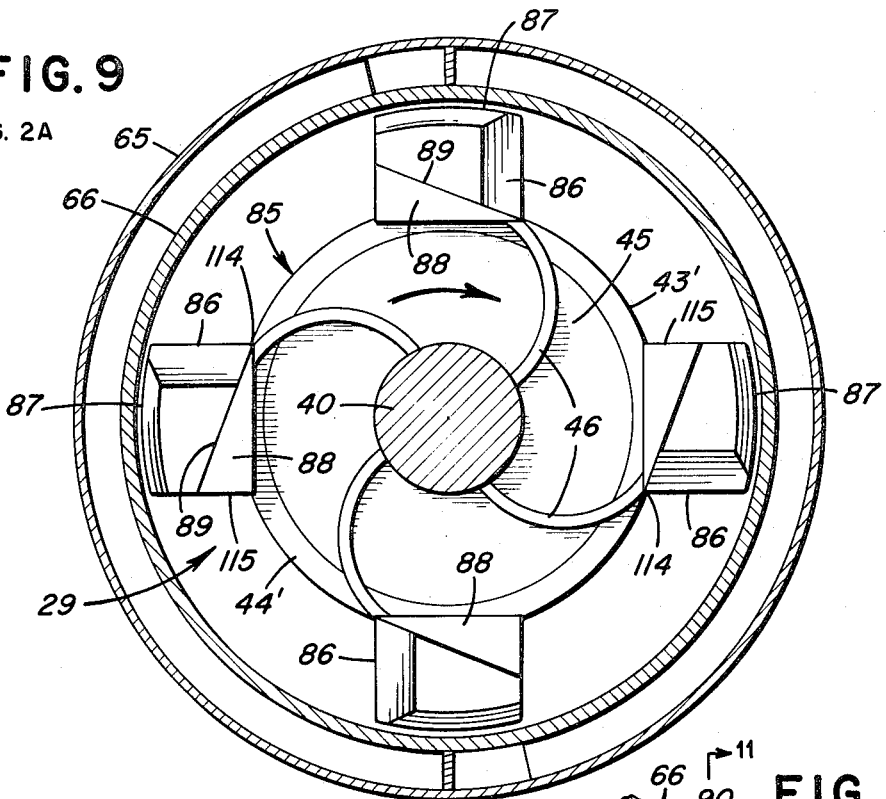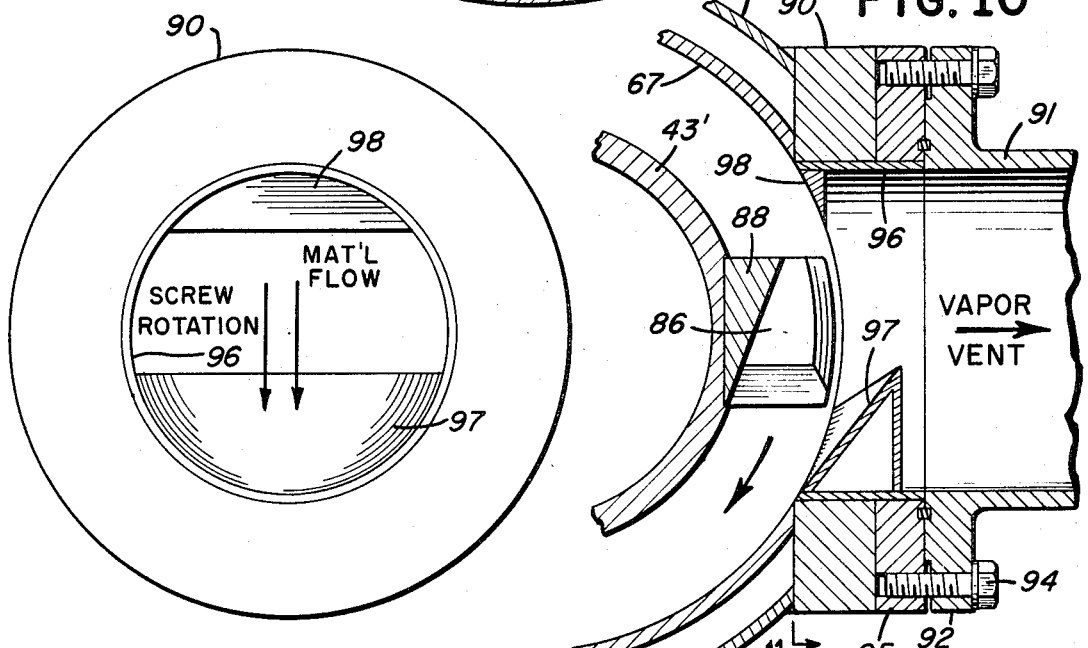

INVENTOR
GEORGE A. LATINEN

BY John W. Klooster
ATTORNEY

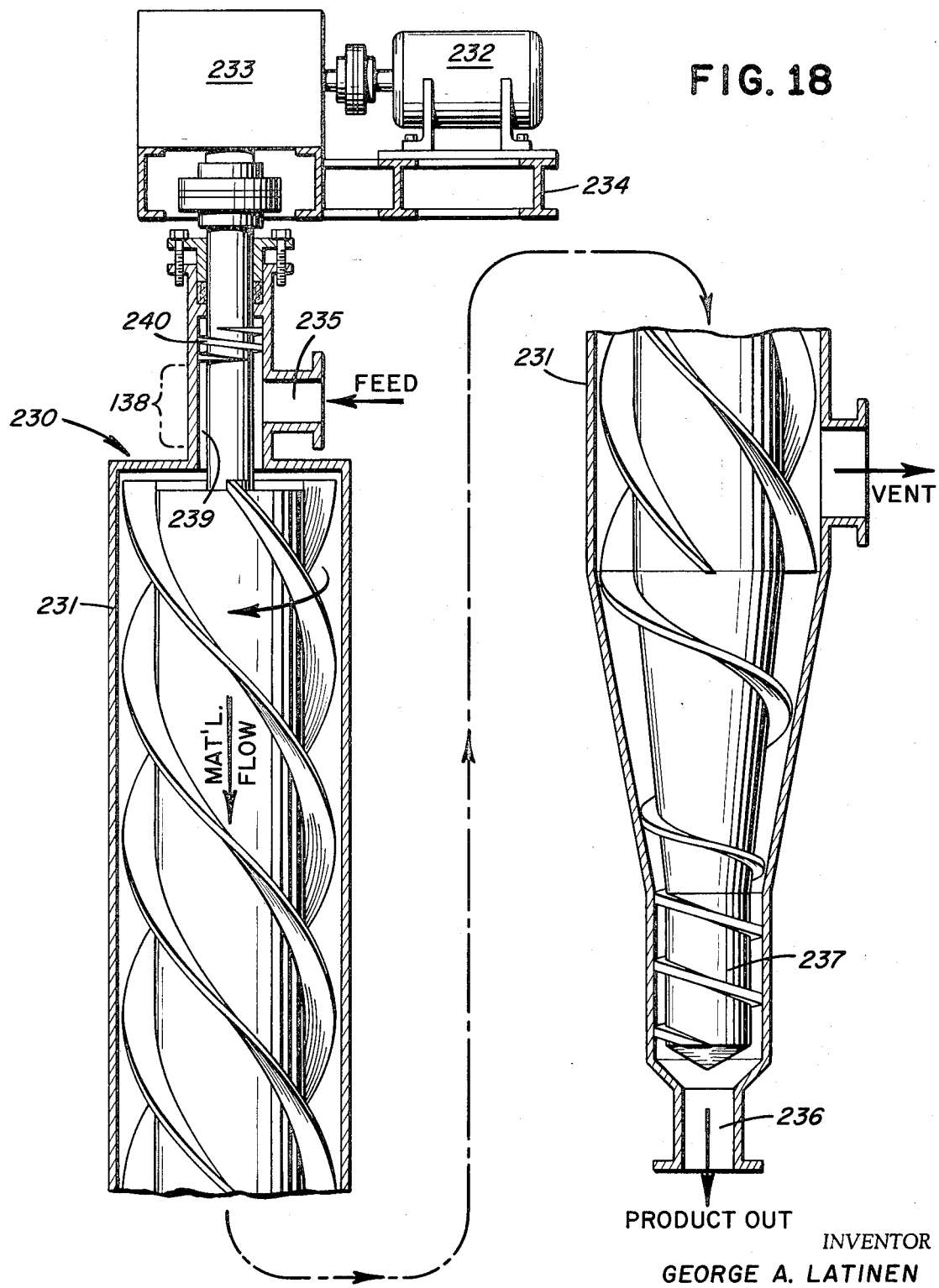

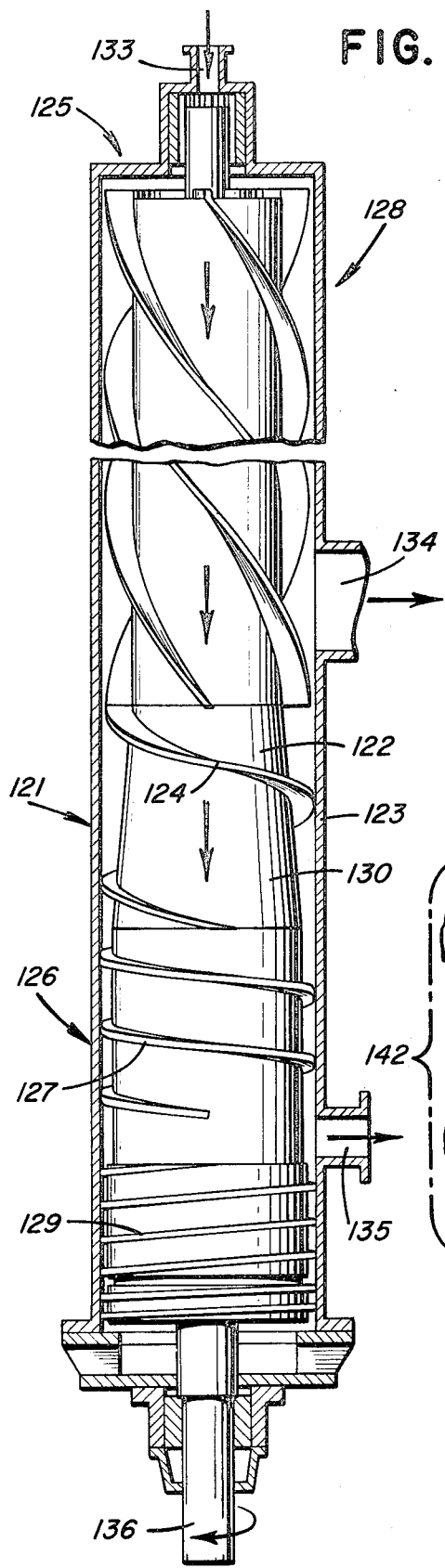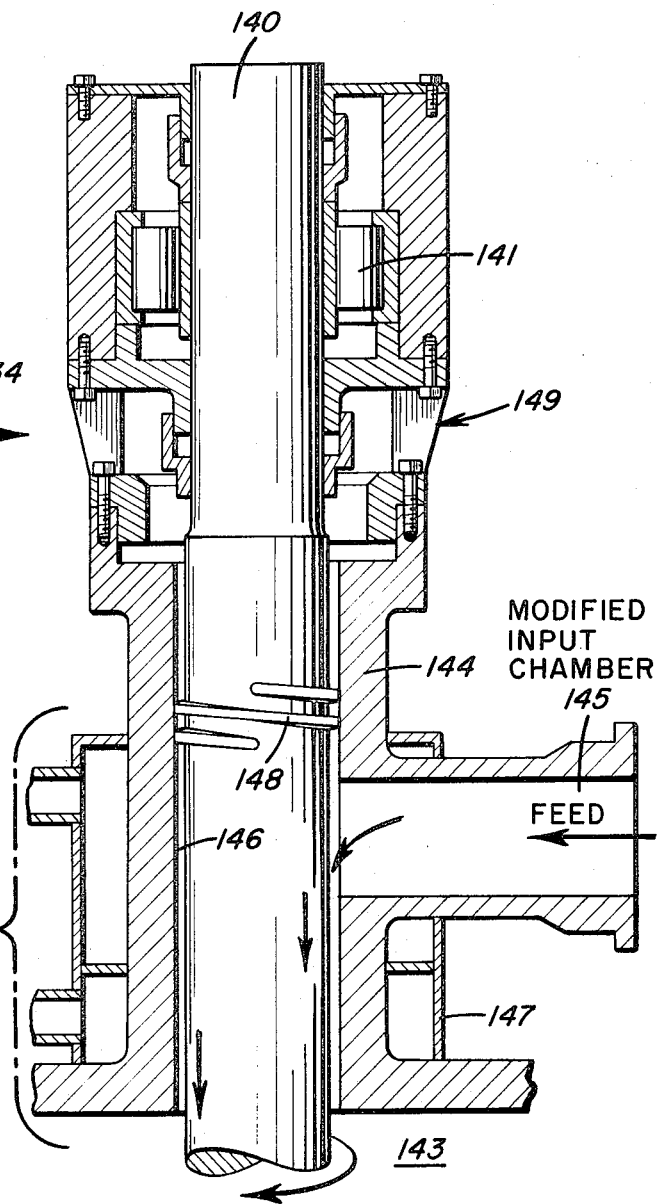

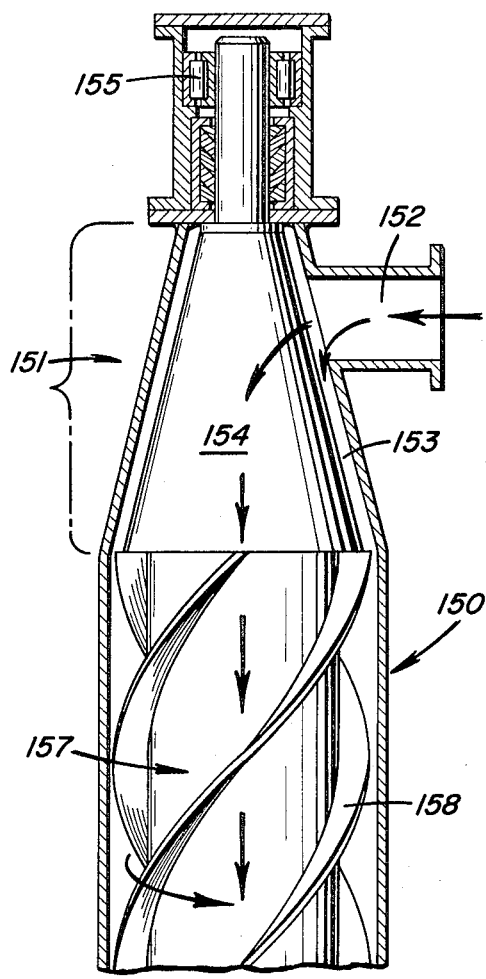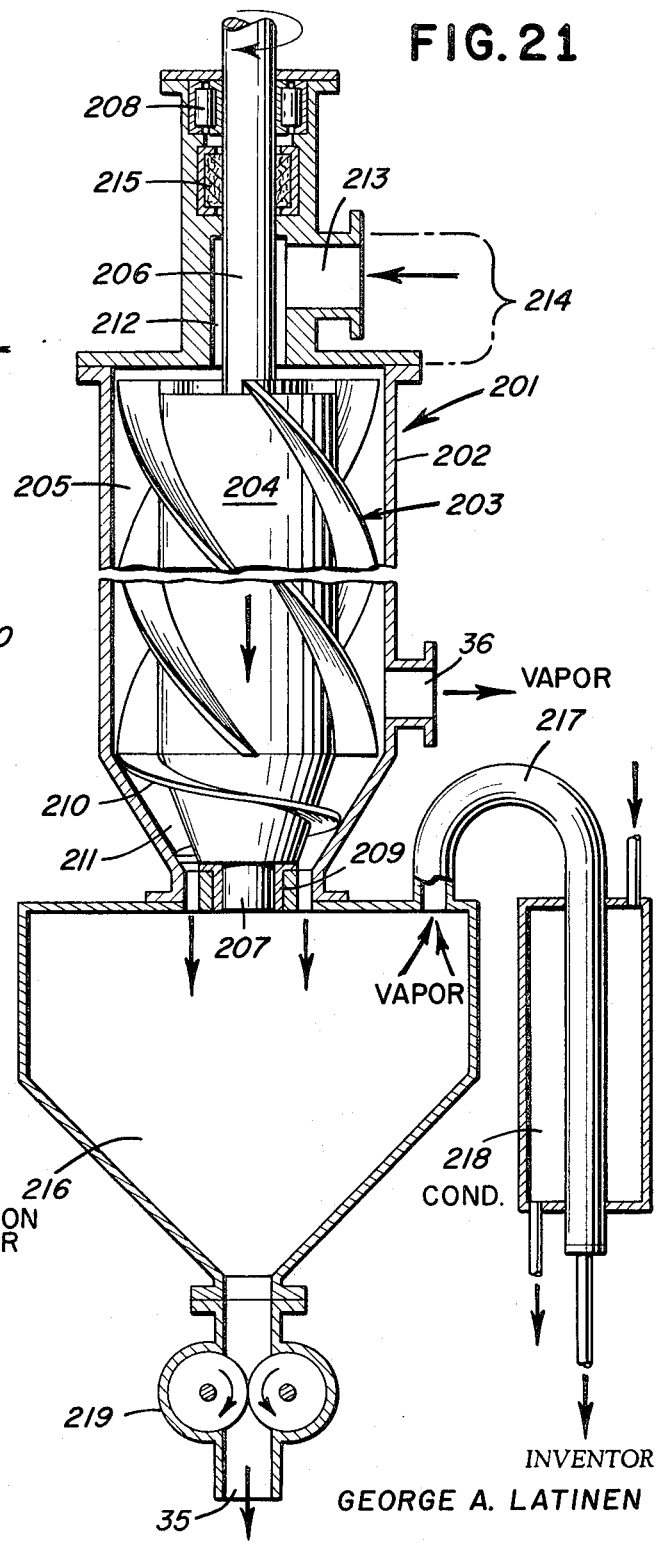

WIPED FILM DEVOLATILIZER CONSTRUCTION

BACKGROUND

In recent years, devolatilizers adapted to separate by evaporation a low boiling material from a higher boiling material have come to be used to an increasing extent in the chemical industry. Devolatilizers are particularly suitable for use in the manufacture of certain synthetic polymeric materials, especially styrene-containing polymers produced by mass and solvent type as well as condensation type polymerizations. In general, devolatilization is accomplished by passing a feed stock in the form of a fluid mass through a zone maintained under appropriate pressure and temperature conditions such that the volatile component escapes in vapor form from the fluid, all as appreciated by those skilled in the art.

One type of devolatilizer is known as the wiped film type where a fluid feed to be devolatilized is fed to a treating zone or separation zone wherein the fluid is spread in the form of a thin film under controlled conditions so as to maximize the surface area of the fluid in the separation zone, thereby to enhance the quantity of volatile materials volatilized. In wiped film devolatilizers heretofore known to the prior art, a fluid feed (typically a melt) enters a generally cylindrically-shaped separation chamber at some location intermediate between chamber ends. Charge rates for the fluid feed are such as to keep the volume of this feed in the separation chamber at a small fraction of the total separation chamber volume. A screw or rotor assembly axially rotatably mounted in the separation chamber spreads the fluid feed as a thin film over interior chamber surface walls and concurrently pumps the feed towards and (typically) vertically up or down and out one end of the chamber. Vapors evolved from the fluid feed pass out of the separation chamber at or near the opposite end and thus flow countercurrently to the direction of the fluid feed. Flights of the screw also function to help move any fluid feed which may become entrained in the vapor back into the main body of the fluid feed particularly in the section of the separation chamber between the fluid feed input port and the vapor take-off port (sometimes called the disengagement section).

Such countercurrent flow of vapor with respect to fluid in the case of highly viscous liquids is disadvantageous. For one thing, in such flow there is a substantial tendency for viscous liquid to be carried over (perhaps in the form of foam) into the vapor and to, or even into, the vapor take-off port, which can produce a serious interference with, or even actual plugging of, the vapor removal and condensing system, especially when the devolatilizer is being operated at relatively low subatmospheric pressures. Furthermore, under such a mode of separation, some viscous liquid may tend to, and not uncommonly does, remain in the disengagement section which tends to increase the residence time of such fraction of viscous liquid in the separation chamber for an excessive period of time as a result of which such fraction becomes discolored or degraded. Subsequently, such fraction becomes mixed with the main body of viscous liquid and reduces the quality of the entire devolatilized viscous liquid removed from the separation chamber. In the case of some heat-sensitive materials, such as, for example, styrene/acrylonitrile copolymers the result is that the product is unusable.

There has now been discovered a new and very useful construction for a wiped film devolatilizer which is especially well adapted for use in devolatilizing highly viscous fluids and which enables one substantially to avoid the problems of separating vapor from liquid associated with conventional wiped film devolatilizers. This wiped film devolatilizer construction has as an advantage or object the substantial elimination of the problem of foam entrainment and carry-over regardless of such variables as fluid feed flow rate, separation chamber pressure level, or screw speed (rpm). At the same time, the capacity of a separation chamber to remove volatile material from a fluid feed, such as a viscous melt, being treated is enhanced in the present invention.

With the devolatilizer construction of this invention, there is a further advantage. Prior art wiped film devolatilizers have generally been top driven necessitating a mounting framework for heavy motor and transmission assemblies in spaced relationship to the bottom portion of such devolatilizer. The present apparatus permits one to bottom drive a wiped film devolatilizer, if desired, with a single motor and transmission assembly without an elaborate, costly superstructure.

Still another advantage of the present invention lies in the circumstance that this apparatus enables one to achieve good seals between the interior of the devolatilizer and exterior regions, particularly where the screw shaft extends through or into the housing. In particular, the apparatus of this invention is well suited for the utilization of the type of reverse screw seals known commonly as viscoseals.

Other and further improvements, advantages, and objects associated with the apparatus of the present invention will be readily apparent to those skilled in the art.

SUMMARY

The present invention is directed to a wiped film devolatilizer construction adapted for use in the processing of fluids (e.g., liquids) to remove volatiles therefrom in a vapor form. This construction employs a fluid tight, generally elongated housing and a rotatable screw assembly therewithin which includes a shaft means, a rotor assembly, a drum shaft means extending through the housing and interconnecting with the shaft means or the rotor assembly (or both). A fluid to be devolatilized enters the housing, passes circumferentially along said shaft means to the rotor assembly, which is in a separation chamber in the housing, and is moved by the rotor assembly through the separation chamber into a succeeding collection chamber of some sort in the housing. Vapors separated from the fluid feed move cocurrently with the fluid feed through the separation chamber.

FIGURE DESCRIPTION

The present invention is better understood by reference to the attached figures wherein:

FIGS. 2A and 2B show a detailed longitudinal sectional view through the embodiment shown in FIG. 1, FIG 2A showing the upper portion of such embodiment with FIG. 2B showing the lower portion thereof, some parts thereof broken away and some parts thereof shown in section;

FIG. 5 shows an alternative form of spline construction for use in the input chamber shown in FIG. 3;

FIG. 6 is a view similar to FIG. 3 and showing an alternative construction for the input chamber;

FIG. 7 is a horizontal sectional view of the embodiment shown in FIG. 6 taken along the line 7—7 thereof;

FIG. 8 is a view similar to FIG. 3 and showing an alternative construction for the input chamber;

FIG. 9 is a horizontal sectional view taken along the line 9—9 of FIG. 2A showing the construction of the rotor assembly adjacent the input chamber;

FIG. 10 is a horizontal sectional view taken along the line 10—10 of FIG. 2A showing the construction of the vapor vent in the separation chamber;

FIG. 11 is a view of the vapor vent looking from the inside of the separation chamber out into the vent opening;

FIG. 16 is a schematic illustration of an alternative embodiment of a devolatilizer assembly of the present invention wherein the taper in the screw assembly is achieved by varying screw shaft diameter internally;

FIG. 17 is a longitudinal sectional view showing a modified input chamber;

FIG. 18 is a schematic longitudinal sectional view taken along one axis showing an alternative embodiment of a devolatilizer assembly of the present invention which is top driven;

FIG. 20 is a longitudinal sectional view showing a modified input chamber; and

FIG. 21 is a schematic longitudinal sectional view taken along one axis showing an alternative embodiment of a devolatilizer assembly of the present invention which has a collection chamber.

DETAILED DESCRIPTION

Figure 1:
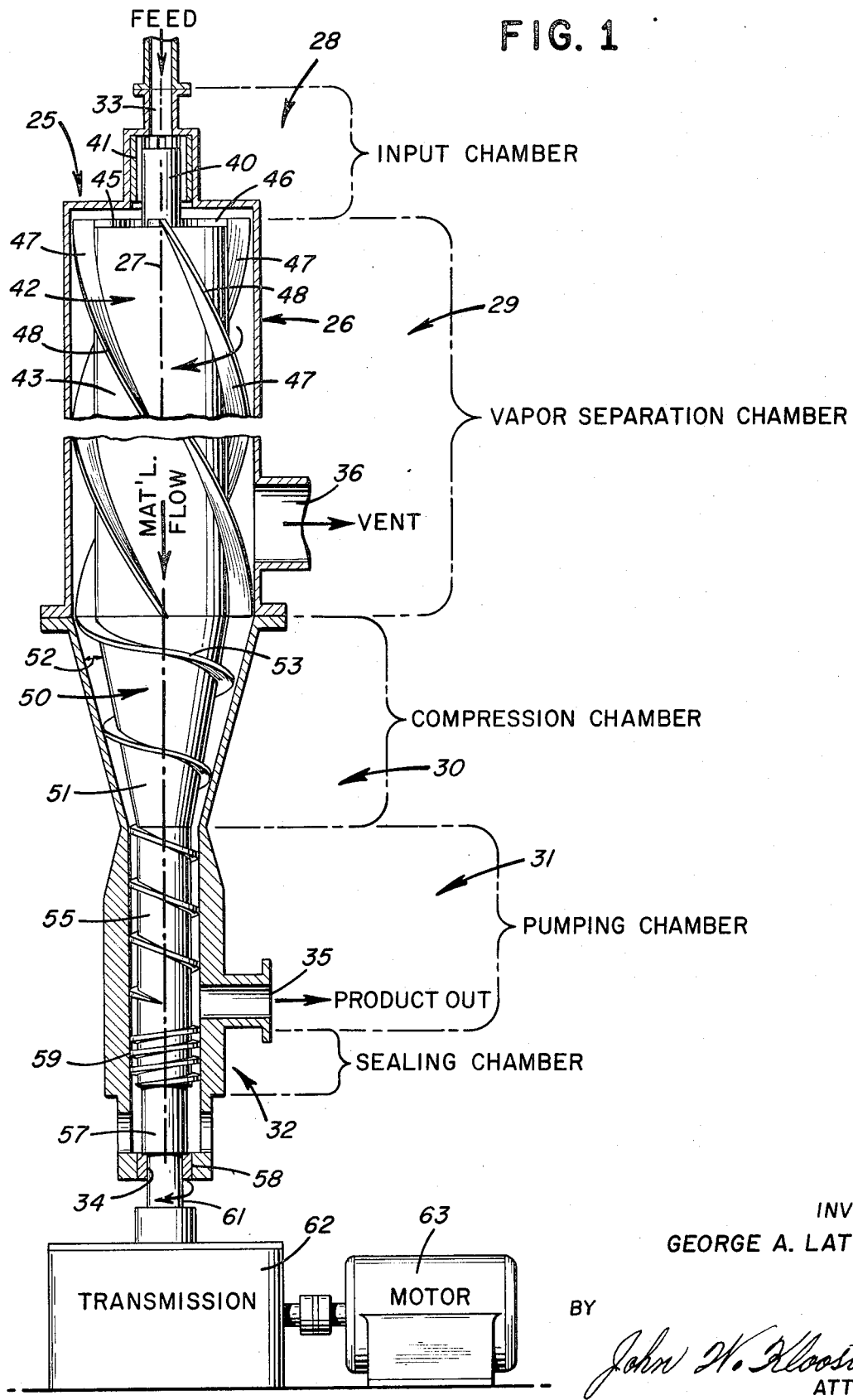
FIG. 1 is a schematic longitudinal sectional view taken along one axis of an embodiment of a devolatilizer assembly of the present invention with various chambers existing in such devolatilizer assembly being marked, some parts thereof broken away and some parts thereof shown in section.

Turning to the drawings, there is seen in FIG. 1 an embodiment of a wiped film devolatilizer of the present invention herein designated in its entirety by the numeral 25. Devolatilizer 25 utilizes a housing 26 which in an operative devolatilizer is substantially gas tight and fluid tight. Housing 26 is generally cross-sectionally circular and symmetrical with respect to a common longitudinal axis 27 extending therethrough. Defined within housing 26 at successive adjoining regions along axis 27 are a series of chambers which sequentially comprise an input chamber 28, a vapor separation chamber 29, a compression chamber 30, a pumping chamber 31 and a sealing chamber 32. The housing has defined therein certain apertures. Thus, housing 26 has an input port 33 leading into input chamber 28. A drive shaft entry port 34 is adjacent the sealing chamber 32, through those skilled in the art will appreciate that the drive shaft entry port could be placed at the other end (not shown) of the devolatilizer assembly 25. An output port 35 from pumping chamber 31 is located typically adjacent the sealing chamber 32. A vapor take-off port 36 is located in separation chamber 29, typically and preferably adjacent compression chamber 30.

Within the input chamber 28 and positioned so as to be generally coaxial with axis 27 is a first shaft 40. A splined bushing construction 41 journals shaft 40 for rotational movements and also permits melt material (not shown) during operation of the devolatilizer 25 entering input chamber 28 to pass from port 33 through input chamber 28 and enter into the separation chamber 29 circumferentially about first shaft 40 (see also, for example, FIG 2A). Thus, in this embodiment sealing means for first shaft 40 is provided by housing 26 itself during operation of the devolatilizer 25 thereby avoiding the necessity for a separate sealing assembly such as is commonly necessary to obtain a fluid seal between a rotating member and a fixed member, as those skilled in the art will appreciate. Additional constructional details for input chamber 28 are given in greater detail hereinafter.

Within separation chamber 29 and located generally coaxially with axis 27 is rotatable rotor assembly, herein designated in its entirety by the numeral 42. Rotor assembly 42 has an axially extending generally enclosed drum 43 with cylindrical side wall portions 44 and an end wall portion 45. End wall 45 is located adjacent input chamber 28. First shaft 40 projects into the vapor separation chamber 29 and interconnects with the end wall portion 45 of drum 43 so that both drum 43 and first shaft 40 are coaxial with axis 27. It will be appreciated that in place of the first shaft 40 within vapor separation chamber 29, one could employ a stub shaft (not shown) on drum 43 which is interconnected with first shaft 40.

A plurality of radially extending, axially projecting rib members 46 are positioned on end wall 45 between shaft 40 and side wall portions 44. Ribs 46 are adapted to deliver material from the region circumferentially located about first shaft 40 to the region circumferentially located adjacent side wall portions 44 of rotor assembly 42.

Integral, radially projecting, circumferentially extending, helical blade members 47 are located on side wall portions 44. Blade members 47 terminate in land regions 48 at and in their respective circumferentially located, radial outer edge portions. All individual land regions 48 are substantially equally radially spaced from axis 27. Individual blade members 47 are so arranged on the side wall portions 44 of drum 43 that substantially every inside cylindrical surface portion of housing 26 in vapor separation chamber 29 adjacent said side wall portions 44 is swept by at least one of the land regions 48 during each revolution of rotor assembly 42 during operation of devolatilizer 25.

The rotor assembly 42 during operation of devolatilizer 25 rotates and is adapted thereby to produce simultaneously several different effects. Thus, the rotor assembly 42 is adapted to move melt material through the separation chamber 29 from the input chamber 28 to the compression chamber 30. In addition, rotor assembly 42 is adapted to spread in the form of a thin film (not shown) at least a portion of melt material in the separation chamber 29 over inside cylindrical surface portions of housing 26 in separation chamber 29. Finally, rotor assembly 42 is adapted to produce cocurrent movement of vapors (which have escaped from melt material) and melt material in the separation chamber 29 as the melt material courses through separation chamber 29 to vapor take-off port 36.

Generally positioned within compression chamber 30 and generally coaxial with axis 27 is a compression screw 50. Compression screw 50 has a shaft portion 51 whose diameter is so related to the inside diameter of housing 26 in the region of compression chamber 30 along the axial length thereof that the radial distance 52 between shaft portion 51 and the inside cylindrical surface portions of housing 26 in the region of compression chamber 30 generally continuously declines along axis 27 proceeding in a direction from separation chamber 29 towards pumping chamber 31. Shaft portion 51 adjacent separation chamber 29 is integral with the side wall portions 44 of drum 43.

Peripherally located, circumferentially extending, and radially projecting is a helical rib 53 which is integral with shaft portion 51. The width of rib 53 in a radial direction is such as to bring the peripheral outside edge portion or land area of rib 53 proximately to the inside cylindrical surface portions of housing 26 in the region of compression chamber 30. The compression screw 50 is thus adapted to collect, compress and convey melt material from separation chamber 29 to pumping chamber 31 during operation of devolatilizer 25.

Generally positioned within the pumping chamber 31 and generally coaxial with axis 27 is a pump screw 55. Pump screw 55 is of conventional design and is adapted to pressurize and convey melt material from compression chamber 30 to melt output port 35. Pump screw 55 adjacent compression chamber 30 is integral with shaft portion 51.

Generally positioned within sealing chamber 32 and generally coaxial with axis 27 is a second shaft 57. Bearing or journal means 58 generally associated with sealing chamber 32 journals and mounts second shaft 57 for rotational movements axially. Adjacent pumping chamber 31, second shaft 57 is integral with pump screw 55.

Generally associated with sealing chamber 32 and adapted to make sealing engagement between second shaft 57 and housing 26 during operation of devolatilizer 25 is a conventional type viscoseal screw assembly 59, though those skilled in the art will appreciate that any conventional sealing means can be used here to achieve sealing engagement between second shaft 57 and housing 26.

Thus, in devolatilizer 25, there is a screw assembly comprising first shaft 40, rotor assembly 42, compression screw 50, extruder screw 55 and second shaft 57. To rotatably drive this screw assembly, power transfer means is provided. In the embodiment shown, such means is provided by short shaft 61 which drives second shaft 57 in a drive such that the screw assembly moves melt material from input port 33 to product output port 35 within housing 26. In turn, shaft 61 is driven by transmission 62, transmission 62 itself being operated by electric motor 63.

Referring to FIGS. 2A and 2B, there is seen a detailed view of devolatilizer 25, but equipped with an alternative rotor assembly which is herein designated in its entirety by the numberal 85. For reasons of constructional convenience, it is convenient to manufacture housing 26 in the form of subassembly sections which are assembled together to form completed housing 26. In the region of vapor separation chamber 29, typical section 65 of housing 26 is seen to be of double walled cylindrical construction, there being an interior cylindrical wall 66 and an outer cylindrical wall 67. The walls 66 and 67 are maintained in fixed predetermined spaced relationship one to the other by means of spacer members 68.

One end of section 65 ends in a male flange member 70, while the other end thereof ends in a female flange member 71. In the flat facing portion of flange 70, a circular groove 72 is provided for receipt of a seal 73. Thus, in an assembled housing 26, flanges 70 and 71, one each on abutting sections 67 (paired), matingly engage into a sealed relationship between one another by means of seal 73.

It will be appreciated that a devolatilizer 25 is conveniently formed of steel with individual pieces being welded or clamped together. Thus, adjacent sections 65 are conveniently secured together by clamping means, welding, or the like.

The flanges 70 and 71 on a pair of abutting sections 65 may be conveniently secured together by C-clamps, nut and bolt assemblies, or the like (not shown). Section 65 is conveniently constructed so that inner-cylindrical wall 66 and outer-cylindrical wall 67 are in fluid tight relationship to one another, in cooperation with flanges 70 and 71 and spacer members 68 so that an appropriate heating or cooling fluid (not shown) can be circulated in the open spaces of a section 65 between walls 66 and 67, thereby to heat or cool a section 65 in a controllable manner. Typically, when a devolatilizer 25 is being used with a polymer melt, a section 65 is maintained in a heated condition relative to the surrounding ambient embodiment, the heating being accomplished by using heated water, oil, or the like, as those skilled in the art appreciate. Such a temperature controlling fluid is conveniently injected into a section 65 through an input nozzle 37 and removed therefrom through an output nozzle 38.

In order to control the temperature of the melt material passing through a devolatilizer 25, it is also desirable to jacket housing 26 in the regions of input chamber 28, compression chamber 30, and pumping chamber 31. Typically, in a devolatilization operation being performed on a polymer in devolatilizer 25, these chambers, like separation chamber 29, are maintained in a heated condition. Thus, input chamber 28 is equipped with jacket assembly 75 and compression chamber 30 and pumping chamber 31 are equipped with jacket assembly 76. Flow paths for fluids into and from jackets 75 and 76 are indicated. Conveniently located, in proximity to a devolatilizer 25 when a heating fluid is employed is apparatus (not shown) for heating such a temperature control fluid and for maintaining such fluid at a predetermined feed temperature to devolatilizer 25, as those skilled in the art will fully appreciate. Because of the possibility of excessive heat buildup in an operating devolatilizer 25 in the region of sealing chamber 32, suitable cooling means for this chamber 32 is preferably provided, such as by cold fingers 117, for which refrigeration apparatus (not shown) for cooling a coolant (not shown) and for maintaining such coolant at a predetermined feed temperature is provided located in proximity to a devolatilizer 25.

Figure 3:
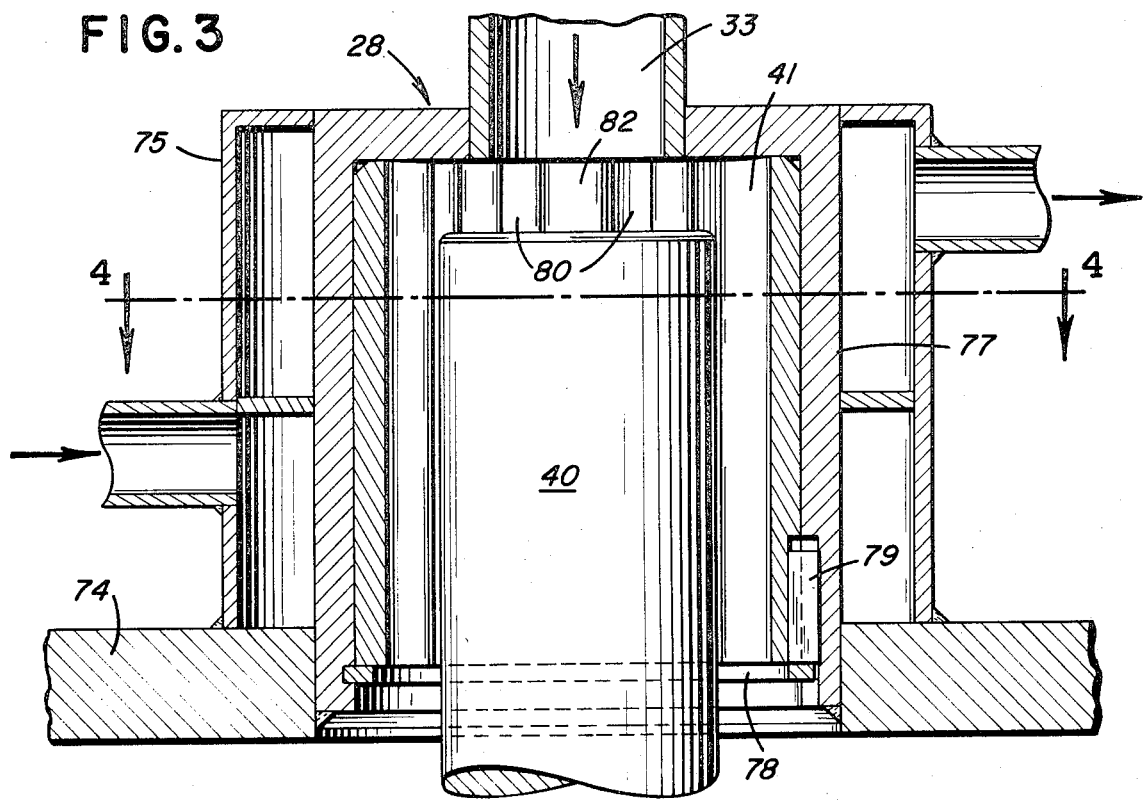
FIG. 3 is a longitudinal sectional view taken through the input chamber of the embodiment shown in FIG. 1.
Figure 4:
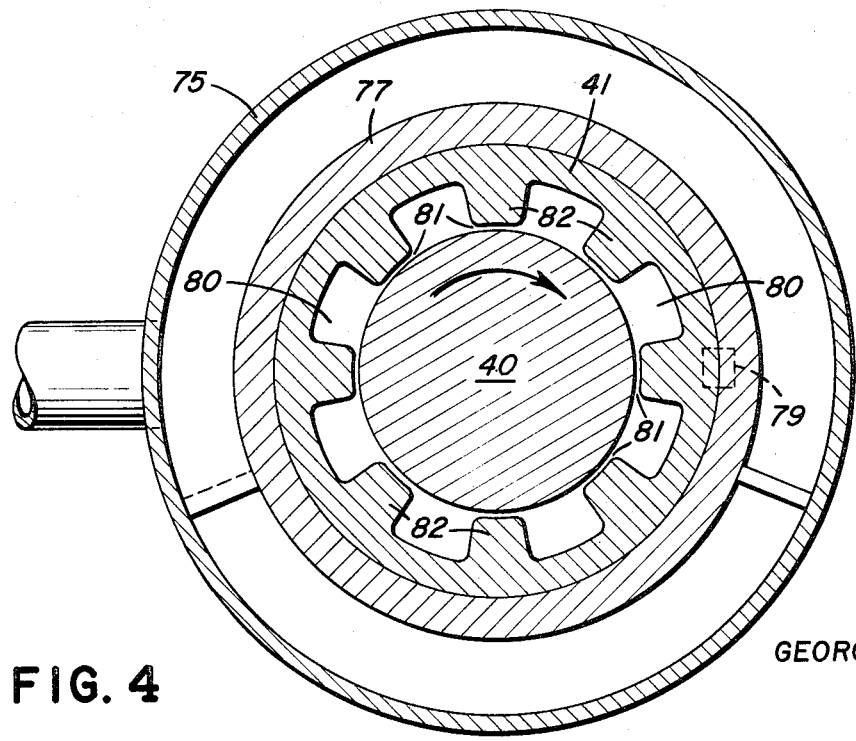
FIG. 4 is a horizontal sectional view of the embodiment shown in FIG. 3 taken along the line 4—4.

Bridging the region between separation chamber 29 and input chamber 28 is a cap plate 74 which joins together a first section 65 and a shell 77 which forms the wall of input chamber 28. Shell 77 is jacketed by jacket assembly 75 in the region of input chamber 28. Interior cylindrical wall surfaces of shell 77 are lined by a splined bushing 41, the bushing 41 being conveniently maintained in position by a retaining ring 78 and a key seat and key assembly 79 (see FIG. 3). Positioned in input chamber 28 so as to be generally coaxial with shell 77 and splined bushing 41 is first shaft 40. When a hot melt (not shown) enters input chamber 28, such passes through and over the axially extending groove spaces 80 existing between shaft 40 and splined bushing 41. Such a melt further serves to lubricate adjacent regions 81 between circumferential portions of first shaft 40 and the radial innermost circumferential surfaces on the rib-like extensions 82 of splined bushing 41. Thus, a melt from input chamber 28 is circumferentially fed into vapor separation chamber 29 about first shaft 40.

Those skilled in the art will appreciate that, in place of the splined bushing 41, one can employ any one of a number of different but functionally equivalent mechanical arrangements in order to achieve delivery, as desired, of melt material from input chamber 28 to separation chamber 29 circumferentially of a first shaft 40. For example, instead of using a splined bushing 41, one can use a splined bushing 100 (see FIG. 5) whose individual rib-like splined extensions 101 spirally extend in a direction along the axis of bushing 100 leaving grooves 102 therebetween for melt material to pass along during devolatilizer 25 operation. With helical splines 101, one achieves direct bearing surfaces between first shaft 40 and the innermost circumferential edges of rib-like extensions 101. Thus, as is characteristic of rotational movements when first shaft 40 rotates in bushing 100, it tends to move about in radial directions (that is, transversely with respect to its axis); and when this occurs, the helical splines 101 provide desirable support for shaft 40.

An alternative arrangement to achieve the desired type of melt material feed is seen in FIG. 8 where a shaft 41' is, in the region of input chamber 28', helically grooved to leave a plurality of axially helically extending rib-like projections 104. These rib-like projections 104 provide bearing surfaces with an adjacent shell 77' and the grooves 105 between adjacent ribs 104 provide channels for movement of melt material from an input port 33 through input chamber 28' into a separation chamber 29' circumferentially of the shaft 41'.

Still another arrangement is illustrated by FIGS. 6 and 7 wherein a shaft 40'' is fitted with two circular discs 107 and 108. The circumferentially extending outside surface portions of discs 107 and 108 engage bearing surfaces on the inside circumferential surfaces of a shell 77''. Each disc 107 and 108 in the region between shaft 40'' and shell 77'' is perforated with a series of generally axially extending holes 109. When shaft 40'' revolves during operation of a devolatilizer, melt material entering through input port 3'' traverses through input chamber 28'' and enters a vapor separation chamber 29'' circumferentially of shaft 40'', as desired.

Yet another arrangement is illustrated in FIG. 17. Here a first shaft 140 is journaled for rotational movement in a roller bearing assembly 141. First shaft 140 extends through an input chamber 142 into a separation chamber 143, chambers 142 and 143 being defined by housing 144. A fluid feed enters input chamber 142 through a conduit 145, passes into and through an annular region 146 between housing 144 and shaft 140 in input chamber 142, and enters separation chamber 143.

Bearing assembly 141 is adjacent to, but axially spaced from, input chamber 142 by a spacer ring assembly 149 to isolate bearing assembly 141 from input chamber 142 in case of any fluid leakage therefrom. Housing 144 is jacketed by a jacket 147 for temperature control purposes. Located adjacent conduit 145, but between conduit 145 and bearing assembly 141, is a viscoseal-type sealing screw 148 which, in this embodiment, is located on shaft 140, but which could be located on the inner wall of housing 144 in input chamber 142.

The circumferentially extending, radially projecting ribs of screw 148 are adapted to form in cooperation with fluid entering input chamber 142 from conduit 145 a seal between shaft 140 and housing 144 when annulus 146 is filled with fluid at a predetermined pressure flowing therethrough into chamber 143 and when shaft 140 is rotating at a predetermined speed. Though the ribs of screw 148 are directed in the embodiment shown in a particular reverse configuration (relative to the direction of shaft rotation), it will be appreciated that any convenient viscoseal screw design can be employed here which will perform the function of urging fluid toward the input chamber 142.

The axial length and radial breadth of annulus 146 are so chosen as to maintain the normal pressure of fluid fed thereto at a level sufficient to activate and make operative screw 148 for purposes of achieving the desired seal in input chamber 142 and at the same time permit fluid to flow into separation chamber 143 circumferentially of shaft 140. As soon as fluid reaches separation chamber 143 in annulus 146, fluid pressure dissipates (owing to the characteristically low pressures typically employed in separation chamber 143). If annulus 146 maintains insufficient pressure, as by letting fluid pass too rapidly therethrough there is insufficient fluid force exerted on screw 148 to make the desired seal; if to the contrary the annulus 146 maintains too much pressure, as by letting too little fluid pass therethrough, there is excessive force exerted on screw 148 and insufficient pressure is dissipated in screw 148 to completely contain fluid. Since, in a typical situation where the present invention is being employed, the reduced pressure in the separation chamber 143 may commonly be easily controlled at a constant, or nearly so, value, not much latitude in design of screw 148 need be taken into account concerning such pressure variations, but the relatively high pressures which may be associated with input fluids moving through annulus 146 can tend to be more variable from an average value so somewhat more latitude in design of screw 148 is desirable, as by including an "extra" turn of threads for screw 148, or the like, to assure seal at some abnormally high transitory operational pressure.

Other arrangements will be apparent to those skilled in the art. In general, any arrangement of elements which will permit one to deliver melt material from an input port through an input chamber to a vapor separation chamber in a manner so as to be circumferentially located about a rotatable shaft may be used in practicing the present invention.

As a rotor assembly 42 for use in vapor separation chamber 29, one may employ any one of a number of different but functionally equivalent means in order to process melt material in the vapor separation chamber 29, as described. One preferred rotor assembly is seen in the embodiment shown in FIGS. 2A and 2B and is herein designated in its entirety by the numeral 85. In rotor assembly 85, a drum 43' is employed whose side wall portions 44' extend radially outwardly a plurality of discrete blade-like members 86. These blade members 86 are arranged into four axially extending rows. These rows are in circumferentially spaced relationship to one another and each now contains approximately an equal number of blade members 86. Although the embodiment shown utilizes four rows, it will be appreciated that any conveninet number of rows can be used from 2 to about 8, 3 or 4 rows presently being preferred. All blade members 86 are circumferentially inclined at an angle between about 10° to 85° with respect to rotor assembly axis 27. In the embodiment shown, each blade member is inclined at a fixed angle of about 30°. Each of the blade members 86 in any given row are generally equally axially spaced from one another. Each blade member 86 has a land portion 87 defined on its circumferentially extending radially outward edge portion. All the land areas of the individual blade members 86 are substantially equally radially spaced from axis 27. In general, the blade-like flattened members 86 are so arranged on side wall portions 44' that substantially all cylindrical regions on the inside walls of separation chamber 29 adjacent the side wall portions 44' of drum 43' are swept by at least one land portion 87 during a single rotation of rotor assembly 85. Thus, each point in the separation chamber 27 adjacent side wall portions 44' has both an axial and a circumferential force vector exerted thereon during rotational movements of the rotor assembly 85.

In rotor assembly 85, between blade member 86 and the side wall portions 44' of drum 43' is an axially extending flange 88 which extends axially under each row of blade members 86. Each flange 86 defines a circumferentially rising ramp-like outside face 89 and has a leading edge 114 and a trailing edge 115. Edges 114 and 115 extend axially and are in circumferentially spaced, parallel relationship to one another. The trailing edge 115 of each flange 88 defines the maximum height of a flange 88 above the circumferential surface of side wall portions 44'. The direction of circumferential rise for all outside faces 89 is substantially the same. The number of flanges 88 employed in a given rotor assembly 85 can vary, the number being generally equal to the number of rows of blade members 86 employed in a given rotor assembly 85.

With rotor assembly 85, as shown in FIGS. 2A and 2B, there are employed a compression screw 50 and a pumping screw 55 each of which is like the corresponding members used in the embodiment of FIG. 1 for rotor assembly 42.

In FIG. 2B, it is seen that a thrust bearing assembly 58' for shaft 57' is employed. Bearing assembly 58' is adjacent to, but somewhat axially spaced from, sealing chamber 32 to isolate bearing assembly 58' from sealing chamber 32 in case of any fluid leakage from chamber 22.

One preferred construction for the region in the vicinity of the vapor take-off port 36 in housing 26 is illustrated by FIGS. 2A, 10 and 11. Extending through a section 65 is an appropriately shaped mounting flange 90. Connected to flange 90 is an elbow pipe 91 which, at its respective input and output ends, is equipped with respective flanges 92 and 93. Extending through flange 93 to couple elbow pipe 91 to flange 90 are a series of bolts 94 which threadably engage mating threading recesses in flange 90. Positioned between flange 93 and flange 90 is a ring 95 of metal. Connected (as by welding or the like) to the interior circumference of ring 95 is a sleeve 96. Mounted on the inside circumferential surface portion of sleeve 96 are two wedge-shaped flanges 97 and 98 which act as baffles to reject melt material within separation chamber 29 which might tend to enter and pass through the vapor take-off port 36 during rotational movements of rotor assembly 85 in operation of devolatilizer 25. While the devolatilizer 25 is operable without flanges 97 and 98 since by the present invention there is only slight tendency for melt material to enter through vapor take-off port 36 from vapor separation chamber 29, it will be appreciated that the efficiency of operation of devolatilizer 25 is improved by the presence of flanges 97 and 98, or equivalent assembly, in a devolatilizer 25.

Turning to FIG. 9, there is seen one preferred construction for a rotor assembly 42 or 85 (here shown as rotor assembly 85) in the region where melt material reaches vapor separation chamber 29 from input chamber 28. As indicated above, melt material (not shown) pours into separation chamber 29 circumferentially about shaft 40 and moves against the end wall 45 of drum 43'. Ribs 46 serve to carry melt material radially outwardly away from shaft 40 across end wall 45 towards side wall portions 44' of drum 43' in a uniform manner. Although in the embodiment shown, ribs 46 are radially concavely curved between shaft 40 and side wall portions 44' (which is preferred), it will be appreciated that any convenient construction may be employed for ribs 46 without departing from the spirit and scope of the invention.

In this description, for convenience, it will be appreciated that in a figure wherein there is a numeral with one or two prime marks thereafter, such primed numeral designates a second or a third embodiment, respectively, wherein the part or element so designated is like or similar to a part or element identically numbered without prime marks in the embodiment of FIG. 1.

Figure 12A:
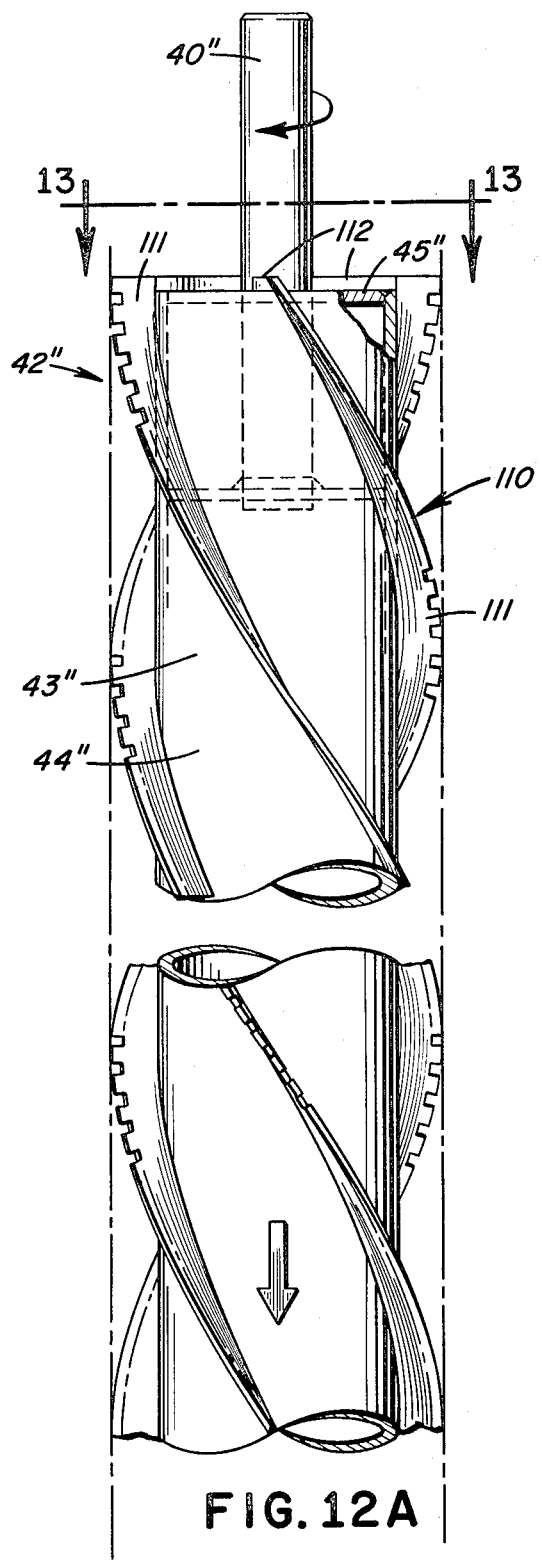
FIGS. 12A and 12B are views done in the manner of FIGS. 2A and 2B but showing an alternative embodiment of a screw assembly for use in the embodiment schematically shown in FIG. 1.
Figure 12B:
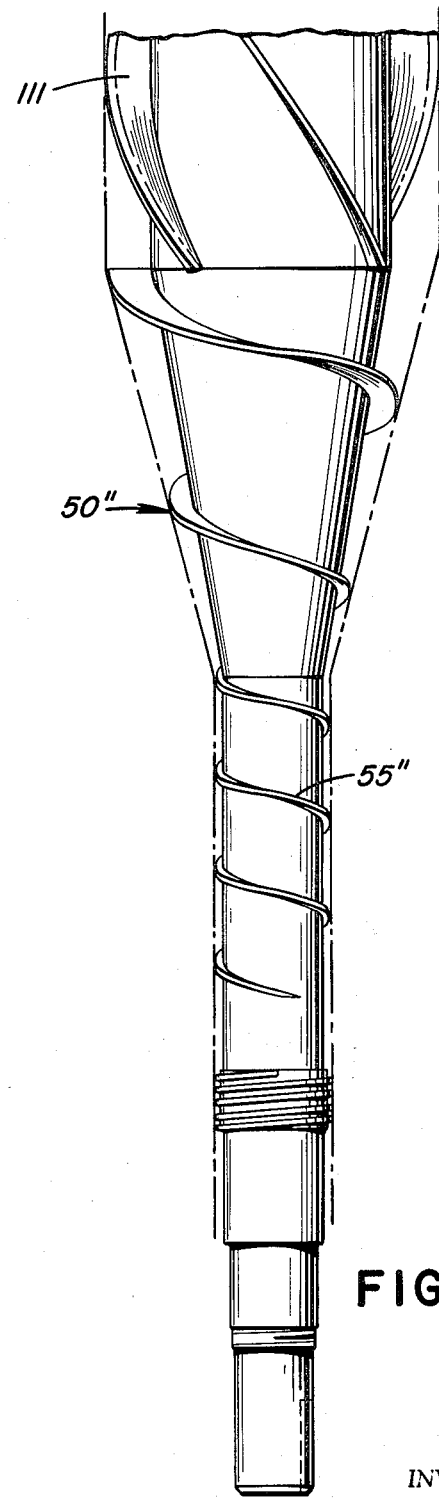

A third (alternative) embodiment of a rotor assembly suitable for use in a devolatilizer 25 is illustrated in FIGS. 12A and 12B and is designated herein in its entirety by the numeral 110. Here, a drum 43" on its side wall portions 44" is equipped with a set of four axially extending, radially projecting rib members 111 which are spiraled in an axially extending direction along the length of drum 43'. Each rib member 111 is serrated or saw-toothed along its outer peripheral circumferentially extended surface portions so that the land regions associated with the rib members 111 lie at the tip regions of each saw tooth. Observe that in this embodiment, the compression screw 50" and the pump screw 55" are similar to these same elements in the embodiments shown in FIG. 1 and in FIGS. 2A and 2B.

Figure 13:
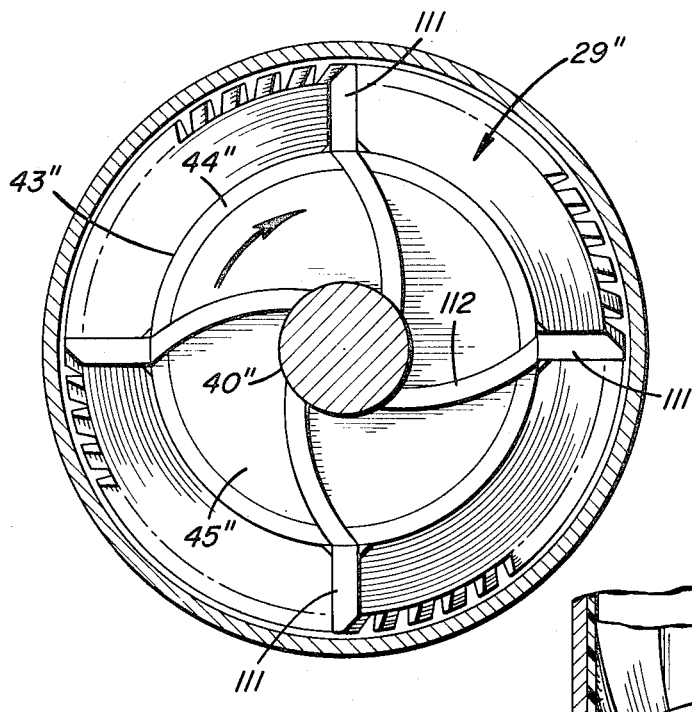
FIG. 13 is a horizontal sectional view taken along the line 13—13 of FIG. 12A showing the construction of the rotor assembly adjacent the input chamber.

In FIG. 13 is seen the type of rib members 112 which are integral with end wall 45" in rotor assembly 110. Here, each rib member 112 radially, outwardly extends axially from end wall 45" from first shaft 40" to engage the end region of a different rib member 111, thereby guiding melt material entering the separation chamber 29" in an efficient manner towards the inside cylindrical surface regions of housing 26 within the separation chamber 29" as devolatilizer 25 operates.

Housing 26 as illustrated in FIGS. 2A and 2B in devolatilizer 25 is generally conically shaped in the region of compression chamber 30, being tapered from a maximum diameter adjacent the region of separation chamber 29 to a final minimum diameter adjacent the region of pumping chamber 31. The thickness of housing 26 in the region of pumping chamber 31 is increased so that housing 26 can withstand the pressures developed here during operation of devolatilizer 25. A single jacket assembly 76 circumferentially embraces housing 26 in the adjoining regions of the compression chamber 30 and the pumping chamber 31.

Figure 14:
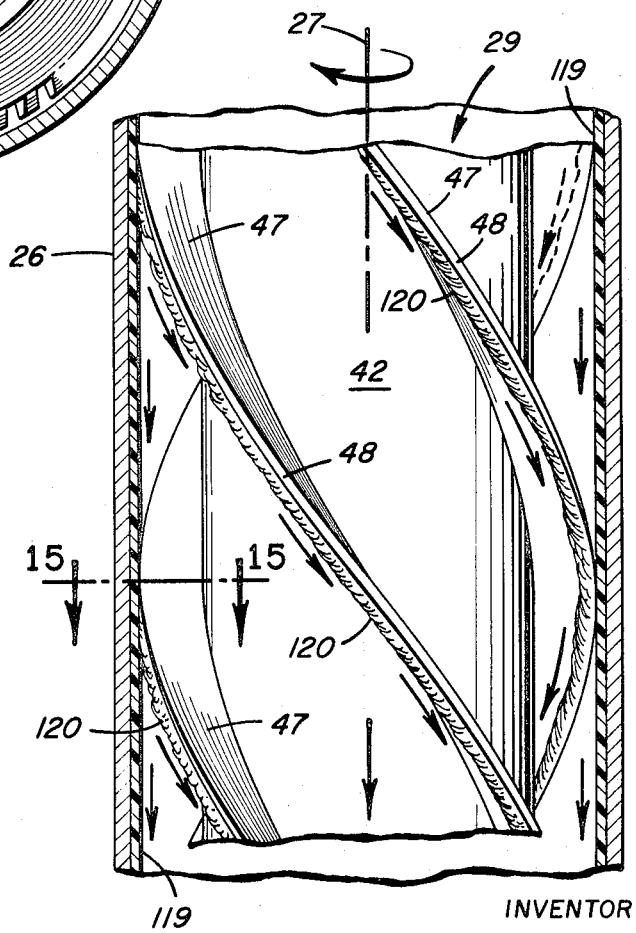
FIG. 14 is a schematic representation of the appearance of melt material in the separation chamber of the devolatilizer embodiment schematically illustrated in FIG. 1 but using the screw assembly depicted in FIGS. 12 and 13.
Figure 15:
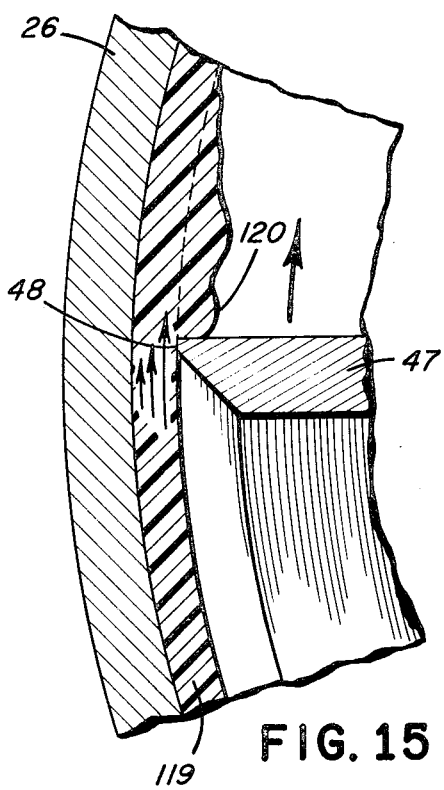
FIG. 15 is an enlarged detailed sectional view taken along the line 15—15 of FIG. 14 showing movement of melt material in an operating devolatilizer of this invention.

The operation of a rotor assembly, such as rotor assembly 42, in the separation chamber 29 of a devolatilizer 25 is illustrated in FIGS. 14 and 15. In FIG. 14 is shown the appearance of a melt material as such moves axially through the separation chamber 29. As the melt material moves in the downwards direction shown, for example, in FIG. 1, such melt material is seen to be distributed in the form of a thin film 119 on the inside cylindrical surface portions of housing 26 within the separation chamber 29. Concurrently, as the rotor assembly 42 turns, a species of wave 120 exists just in front of the land region 48 on each blade member 47. Owing to the fluid mechanical nature of the melt material, in the course of a plurality of revolutions of rotor assembly 42, the melt material comprising a thin film 119 gradually becomes caught up and becomes a part of wave 120, only to be redeposited at a further point on the side wall of housing 26 in vapor separation chamber 29 at a further point on downwardly in the vapor separation chamber 29. The process is gradually repeated for all melt material in vapor separation 29 until all material entering input chamber 28 is expelled through the product output port 35. Typical circumferentially exerted force vectors in film 119 are suggested by the arrows shown adjacent land region 48. In the region immediately adjacent housing 26, very little fluid movement occurs in film 119, but the rate of fluid movement in thin film 119 increases as one moves towards a land region 48.

Although the housing 26 is externally tapered downwardly about compression chamber 30 from a maximum to a minimum cross-sectional diameter in the region of pumping chamber 31, such a taper is not necessary in order to practice the present invention. Thus, for example, one may employ a housing whose cross-sectional diameter substantially is constant through the various chambers. In FIG. 16 is shown an embodiment of such a devolatilizer assembly which is herein designated in its entirety by the numeral 125. Devolatilizer 125 employs a vapor separation chamber 128 which is similar to that in the embodiment shown, for example, in FIG. 1. However, here, in devolatilizer 125, when the compression chamber 121 is reached, the desired compression effect to be achieved between the compression screw assembly 122 and housing 123 is gained by controlling the diameter of shaft 130 of compression screw assembly 122 while maintaining the threads 124 of screw assembly 122 at a desired fixed spacial distance from the inside surface portions of housing 123; then, as material leaves the region of compression chamber 121 and enters the region of pumping chamber 126, an entering zone of high pressure is found in the peripheral outer edge portions of the chamber 126 between the pumping screw 127 and housing 123. As in the case of the embodiments shown in FIG. 1, sealing means in the sealing chamber is here provided by a viscoseal sealing screw arrangement 129, but of course, the diameter of the viscoseal screw 129 is enlarged to accommodate the larger diameter of the housing 123 in this region. Fluid material is fed through an input port 133 and removed from devolatilizer 125 through an output port 135. Vapor is removed through a vapor take-off port 134. A power source (not shown) is used to drive second shaft 136.

To progressively reduce the volume of the compression chamber axially between the separation chamber and the pumping chamber, those skilled in the art will appreciate that, instead of continuously axially shortening the radial distance (such as 52 in devolatilizer 25), one can keep this distance constant between separation chamber and pumping chamber and still achieve the desired volume reduction by simply controlling the angles of housing and compression screw shaft at some value since cross-sectionally the compression chamber volume is progressively reduced by this means alone. Those skilled in the art will also appreciate that any convenient number of screw threads may be employed in a compression screw.

In FIG. 18 is shown an embodiment of a devolatilizer herein designated in its entirety by the numeral 230. Devolatilizer 230 has a housing 231 with chambers therein similar to those of the embodiment of FIG. 1. Mounted for rotational movements therein is a screw assembly analogous to that shown in such embodiment of FIG. 1. However, in the embodiment 230, the screw assembly is top driven by a motor 232 and transmission 233 supported on an appropriate frame 234. Material is fed into conduit 235 and product is removed from a bottom vent 236 beneath the end of a screw pump 237. Operation is otherwise like that of the embodiment of FIG. 1. Construction of input chamber 238 includes an annulus 239 and a viscoseal-type sealing screw 240.

Figure 19:
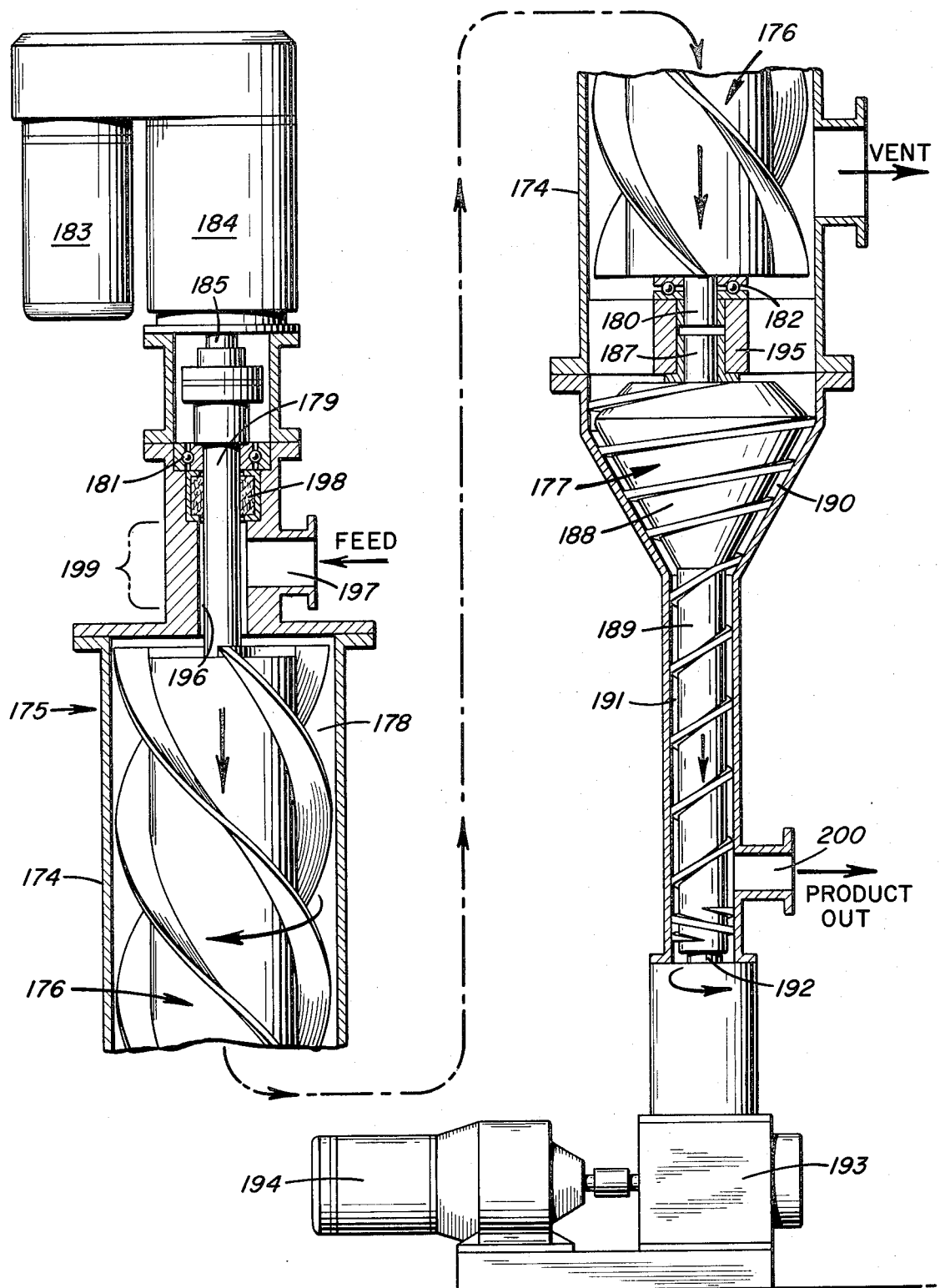
FIG. 19 is a schematic longitudinal sectional view taken along one axis showing an alternative embodiment of a devolatilizer assembly of the present invention which is both top and bottom driven.

In FIG. 19 is shown an embodiment of a devolatilizer herein designated in its entirety by the numeral 175 which utilizes the present invention. Devolatilizer 175 has a housing 174 in which are mounted two screw assemblies, one designated 176, the other 177. Screw assembly 176 comprises a rotor assembly 177 which is adapted to rotate in a separation chamber 178 and a pair of shafts 179 and 180 integral therewith at opposite end portions thereof. Shaft 179 is journaled by bearing assembly 181 for rotational movements, as is shaft 180 in bearing assembly 182, each bearing assembly 181 and 182 being mounted in housing 174. Screw assembly 176 is driven by motor 183 which transfers power to shaft 179 through transmission 184 and coupled drive shaft 185. Screw assembly 177 comprises a stub shaft 187, a compression screw 188, and a screw pump 189 which are integral with one another, the compression screw 188 being in a compression chamber 190 and the screw pump 189 being in a pumping chamber 191. A drive shaft 192 integral with screw pump 189 connects with a transmission assembly 193 and an interconnected motor 194. Stub shaft 187 is journaled for rotational movements by bearing assembly 195, as is shaft 192 by bearing means (not shown) but located in the transmission assembly 193. A fluid to be devolatilized is fed into an annulus 196 about shaft 179 from conduit 197 into an input chamber 199 and passes into separation chamber 178 in the manner, for example, of the embodiment shown in FIG. 1. Sealing means 198 is provided to seal the end of annulus 196 remote from the separation chamber 178. After tranversing the interior of devolatilizer 175, product is removed from conduit 200.

In FIG. 20, there is seen an embodiment of a devolatilizer 150 having incorporated thereinto a modified input chamber. Such input chamber is designated in its entirety by the numeral 151. Into an input conduit 152, an input melt fluid (not shown) is injected. The fluid passes from conduit 152 into an annular region 153 which is in the shape of a frustoconical section. The outside wall of annulus 153 is formed by the housing of devolatilizer 150; the inside wall thereof is defined by shaft 154. Shaft 154 is mounted coaxially with the housing of devolatilizer 150 and in the region of input chamber 151; shaft 154 is, itself, frustoconical in side elevation. A stub shaft portion integral with one end of shaft 154 is journaled for rotational movements by bearing assembly 155. Bearing assembly 155 is sealed in the housing of the devolatilizer 150. In its vapor separation chamber 157, the devolatilizer 150 employs a rotor assembly similar to that employed, for example, in the embodiments shown in FIG. 1. A fluid melt material fed to input chamber 151 through conduit 152 passes through annulus 153 and into separation chamber 157. Because annulus 153 is conically shaped, material in annulus 153 is directly fed into the circumferential end region of separation chamber 157 where the axially extending, helically curved blade members of rotor assembly 158 directly function to spread a fluid melt material over the inside walls of separation chamber 157 and to move such material along axially in such separation chamber.

In FIG. 21 is shown an embodiment of a devolatilizer herein designated in its entirety by the numeral 201 which utilizes the present invention. Devolatilizer 201 has a housing 202 in which is mounted a screw assembly 203. Screw assembly 203 comprises a rotor assembly 204 which is adapted to rotate in a separation chamber 205, a compression screw which is adapted to rotate in a compression chamber 211 and is integral and coaxial with rotor assembly 203, and a pair of shafts 206 and 207 coaxial and integral therewith at opposite end portions thereof. Shaft 206 is journaled by bearing assembly 208 for rotational movements as is shaft 207 in bearing assembly 209, each bearing assembly 208 and 209 being mounted in housing 202. A fluid to be devolatilized is fed into an annulus 212 about shaft 206 from conduit 213 into an input chamber 214 and passes into separation chamber 205 in the manner, for example, of the embodiment shown in FIG. 1. Packing gland 215, or the like, is provided to seal the end of annulus 212 remote from the separation chamber 205. After passing through separation chamber 205 and compression chamber 211, product passes into a collection chamber 216. Vapors from fluid being devolatilized is withdrawn from collection chamber 216 via conduit 217 and condensed in a condenser 218. Product is withdrawn from collection chamber 216 via a gear pump 219 or the like. A collection chamber 216 in this embodiment 201 thus serves to replace a screw pump as described earlier.

Many other embodiments and variations of this invention will occur to those skilled in the art from a reading of the present specification.

What is claimed is:

1. A wiped film devolatilizer adapted for the processing of relatively viscous fluid, melt material comprising:

A. a substantially gas tight and fluid tight, generally cross-sectionally circular, elongated housing
   1. said housing defining therewith at successive regions along a common axis extending therethrough
      a. an input chamber adjacent one end of said housing,
      b. an enlarged, elongated, cylindrical vapor separation chamber,
      c. a compression chamber,
   d. a pumping chamber, and
      e. a sealing chamber adjacent the other end of said housing,
   2. said housing having defined therein
      a. an input port into said input chamber,
      b. a drive shaft entry port in either opposed end of said housing,
      c. a product output port from said pumping chamber adjacent said sealing chamber, and
      d. a vapor take-off port in said separation chamber adjacent said compression chamber,
B. a first shaft means generally positioned within said input chamber and generally coaxial with said axis, said first shaft means comprising:
   1. a rotatably mounted central portion, and
   2. journal means mounting said central portion for rotational movements,
   3. said central portion and said journal means together being adapted to cause during rotational movements of said central portion in operation of said devolatilizer melt material in said input chamber to pass from said input port and enter into said separation chamber circumferentially about said central portion, and
C. first sealing means generally associated with said input chamber and adapted to make sealing engagement between said first shaft means and said housing during operation of said devolatilizer,
D. a rotatably mounted rotor assembly generally positioned wtihin said separation chamber and generally coaxial with said axis, said rotor assembly comprising:
1. an axially extending, generally enclosed, drum having cylindrical side wall portions and an end wall portion adjacent said input chamber,
2. a stub shaft means coaxial with said axis and interconnecting said first shaft means and said end wall portion of said drum,
3. a plurality of radially extending, raised rib members integral with said end wall portion and positioned between said stub shaft means and said side wall portions,
4. a plurality of blade members integral with, and radially extending outwardly from, said side wall portions and terminating in land regions at respective outer edge portions, all individual land regions being substantially equally radially spaced from said axis, said blade members being so arranged that substantially every inside cylindrical surface portion of said housing in said separation chamber adjacent said side wall portions is swept by at least one of said land regions during each revolution of said rotor assembly during operation of said devolatilizer,
5. said rotor assembly being adapted during operation of said devolatilizer to produce simultaneously
  a. movement of melt material through said separation chamber from said input chamber to said compression chamber,
  b. spreading in the form of a thin film of at least a portion of melt material over said inside cylindrical surface portions of said housing in said separation chamber, and
  c. cocurrent movement of vapors escaping from melt material with said melt material in said separation zone to said vapor take-off port,
E. compression screw means generally positioned within said compression chamber, and generally coaxial with said axis, said compression screw means
1. having a shaft portion whose outside diameter is so interrelated to the inside diameter of said housing in said compression chamber along the axial length thereof that the radial distance between said shaft portion and the inside cylindrical surface portions of said housing in said compression chamber generally continuously declines in the axial direction from said separation chamber to said pumping chamber, said shaft portion adjacent said separation chamber being integral with side wall portions of said drum,
2. having a peripherally located, circumferentially located, radially projecting, helically extending rib integral with said shaft portion, the width of said radial projection bringing said rib proximately to the inside cylindrical surface portions of said housing in said compression chamber,
3. being adapted to collect, compress, and convey melt material from said separation chamber to said pumping chamber during operation of said devolatilizer,
F. screw pump means generally positioned within said pumping chamber and generally coaxial with said axis, said screw pump means being adapted to pressurize and convey melt material from said compression chamber to said product output port, said screw pump means adjacent said compression chamber being integral with said shaft portion,
G. second shaft means generally positioned within said sealing chamber and generally coaxial with said axis including journal means mounting said shaft for rotational movements, said second shaft means adjacent said pumping chamber being integral with said screw pump means,
H. second sealing means generally associated with said sealing chamber and adapted to make sealing engagement between said second shaft means and said housing during operation of said devolatilizer, and
I. power transfer means functionally associated with either said first or said second shaft means and adapted to rotatably drive same in a direction to move melt material from said input port to said product output port in said housing responsive to a power source functionally interconnected therewith during operation of said devolatilizer.

2. The devolatilizer of claim 1 wherein in the region of said vapor take-off port baffle means are provided which is adapted to retard leakage of melt material from said separation chamber through said vapor take-off port during operation of said devolatilizer.

3. The devolatilizer of claim 1 further equipped with

A. a first heat control means jacketing said housing exteriorly of said separation chamber and adapted to transfer heat into said separation chamber therefrom, and
B. second heat control means functionally associated with said housing exteriorly of said pumping char and adapted to remove heat from said pumping chamber.

4. The devolatilizer of claim 1 equipped with a transmission operated by a motor functionally interconnected with said power transfer means.

5. The devolatilizer of claim 1 wherein said second sealing means is a viscoseal.

6. The devolatilizer of claim 1 wherein said journal means comprises a splined bushing whose circumferentially extending outside surfaces at least partially engage said housing and whose circumferentially extending inside surfaces include a plurality of axially extending, radially inwardly projecting riblike projections which, taken together are adapted to provide a bearing surface on their circumferential innermost surfaces for said central portion, and further adapted to permit flow of melt material circumferentially of said central portion during operation of said devolatilizer.

7. The devolatilizer of claim 6 wherein said rib-like projections are spirally arranged.

* * * * *